United States Patent

Curwen

[15] 3,668,427

[45] June 6, 1972

[54] OPTICAL PYROMETER AMPLIFIERS

[72] Inventor: Kenneth R. Curwen, Southampton, England

[73] Assignee: Kollsman Instrument Limited, Southampton, England

[22] Filed: Apr. 8, 1970

[21] Appl. No.: 26,714

[30] Foreign Application Priority Data

Apr. 10, 1969 Great Britain ......................18,526/69

[52] U.S. Cl. ............................................307/229, 328/145

[51] Int. Cl. ...........................................................G06g 7/12

[58] Field of Search ..........................328/3, 6, 142, 145, 163; 340/227, 228; 307/310, 230, 229

[56] References Cited

UNITED STATES PATENTS

| | | | |
|---|---|---|---|
| 3,546,612 | 12/1970 | Day | 328/142 X |
| 2,942,417 | 6/1960 | Best et al. | 328/3 X |
| 3,393,870 | 7/1968 | Jeffrey | 307/310 X |
| 3,408,582 | 10/1968 | Britton | 328/145 X |
| 3,499,160 | 3/1970 | Gordon | 328/145 X |
| 2,935,687 | 5/1960 | Eschner | 328/145 |

OTHER PUBLICATIONS

Bakke et al., " Temperature Compensated Current Source," IBM Technical Disclosure Bulletin, Feb. 1966, p. 1289

*Primary Examiner*—Roy Lake
*Assistant Examiner*—James B. Mullins
*Attorney*—Pope, Ballard, Kennedy, Shepard & Fowle, J. Patrick Cagney and E. Manning Giles

[57] ABSTRACT

A linearizing circuit for producing output signals varying linearly with temperature from input signals derived from a pyrometer head and varying non-linearly with temperature comprising an input amplifier stage responsive to said non-linear input signals, a linearizing network responsive to output signals from the amplifier stage and including a circuit for generating signals representative of the logarithm of the input signal and summation means for adding a portion of the input signal and a fixed value signal to the logarithmic signal to produce an output signal which is substantially linear with temperature and an output amplifier stage responsive to output signals from the linearizing network to produce amplified signals arranged to be supplied to components associated with the pyrometer head and/or fed back to the head.

7 Claims, 10 Drawing Figures

KENNETH R. CURWEN
INVENTOR
BY J. Patrick Cagney
ATTORNEY

INVENTOR
KENNETH R. CURWEN
BY J. Patrick Cagney
ATTORNEY

INVENTOR
KENNETH R. CURWEN
BY J. Patrick Cagney
ATTORNEY

INVENTOR
KENNETH R. CURWEN
BY J. Patrick Cagney
ATTORNEY

INVENTOR
KENNETH R. CURWEN
BY J. Patrick Cagney
ATTORNEY

INVENTOR
KENNETH R. CURWEN
BY J. Patrick Cagney
ATTORNEY

INVENTOR
KENNETH R. CURWEN
BY J. Patrick Cagney
ATTORNEY

INVENTOR
KENNETH R. CURWEN
BY J. Patrick Cagney
ATTORNEY

INVENTOR
KENNETH R. CURWEN
BY J. Patrick Cagney
ATTORNEY

OPTICAL PYROMETER AMPLIFIERS

This invention relates to linearizing circuits and particularly to a method and means for linearizing the signal produced from a pyrometer head by application to a pyrometer amplifier such as to produce output signals varying linearly with temperature for application to other components and for producing temperature compensating output signals which are fed back to the pyrometer head.

The characteristic of a pyrometer head is highly non-linear and is generally quoted to be a power law; the general form of its curve being seen to approximate to a logarithmic function when the linear output of the amplifier is plotted against a logarithmic scale of input and the plot gives an approximation to a straight line. The linearization of a curve of this form involves only a single stage of logarithmic conversion and thus, although the curve deviates from a true line by as much as 40° C over the range of 850° to 1,000° C where best accuracy is sought, compared with a deviation of 10° C for a curve of input and output both plotted on a logarithmic scale, the linearization of a curve of linear output plotted against input on a log scale, gives advantages compared with which the increased deviation with temperature is not a limiting factor.

An object of the present invention is to provide a linearization circuit involving the mechanization of a technique in which linearization is effected of a graph where output on a linear scale is plotted against input on a log scale.

A more specific object of the present invention is to provide a pyrometer amplifier which accepts input signals varying non-linearly with temperature from a pyrometer head and which linearizes the signals to produce output signals varying linearly with temperature which may be fed back to the pyrometer head or to other components associated with the head.

A further object of the invention is to provide a device for linearizing the signal from a semiconductor radiation sensor into a temperature signal by an electronic logarithmic transform.

A still further object of the invention is to provide a device for adding a small proportion of the input signal to the logarithmic function to give optimum linearization at high temperatures.

According to the present invention there is provided a linearizing circuit comprising an input amplifier stage responsive to input signals varying non-linearly with temperature and derived from a pyrometer head, a linearizing circuit responsive to output signals from the input amplifier stage for producing output signals varying linearly with temperature and an output amplifier stage responsive to the output signals from the output of the linearizing circuit such as to produce amplified output signals arranged to be supplied to one or more components associated with the pyrometer head and/or to be fed back to the pyrometer head.

The invention will now be described by way of example only with particular reference to the accompanying drawings, wherein.

Figure 4:
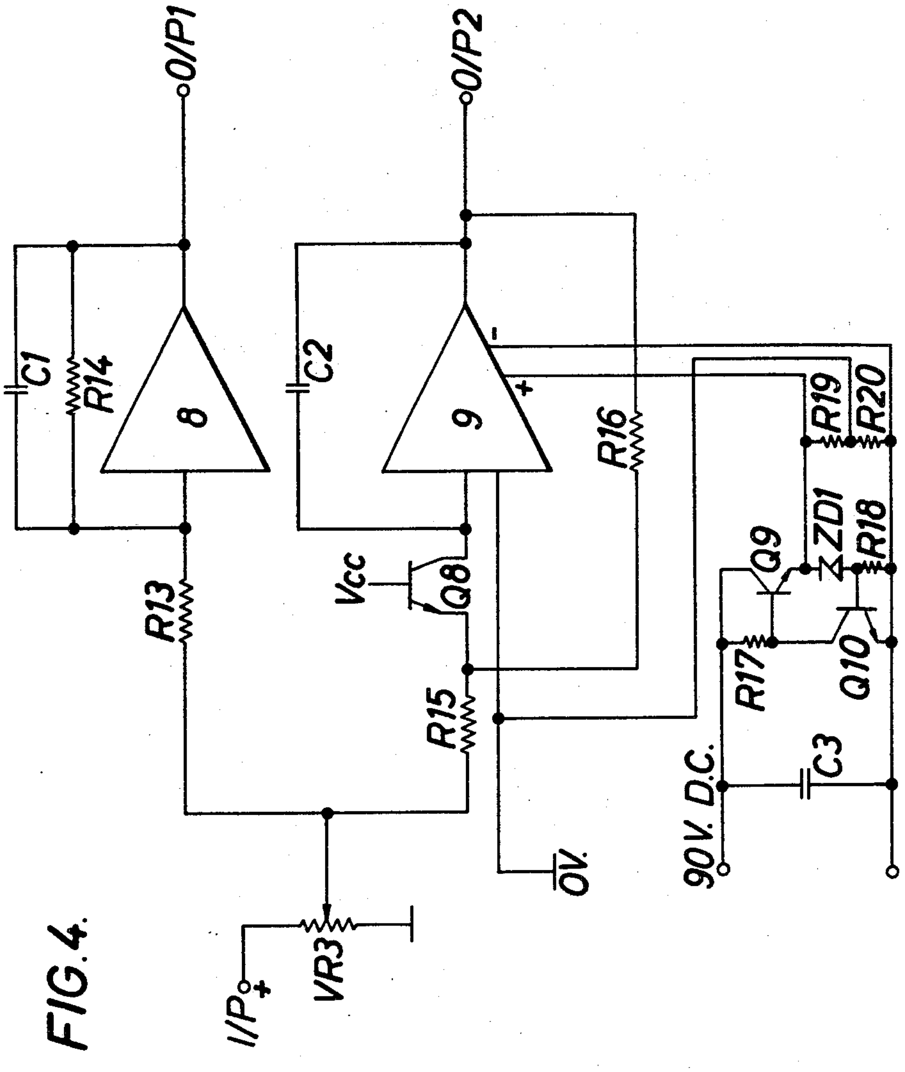
FIG. 4 is a circuit diagram of the output amplifier thereof.
Figure 6:
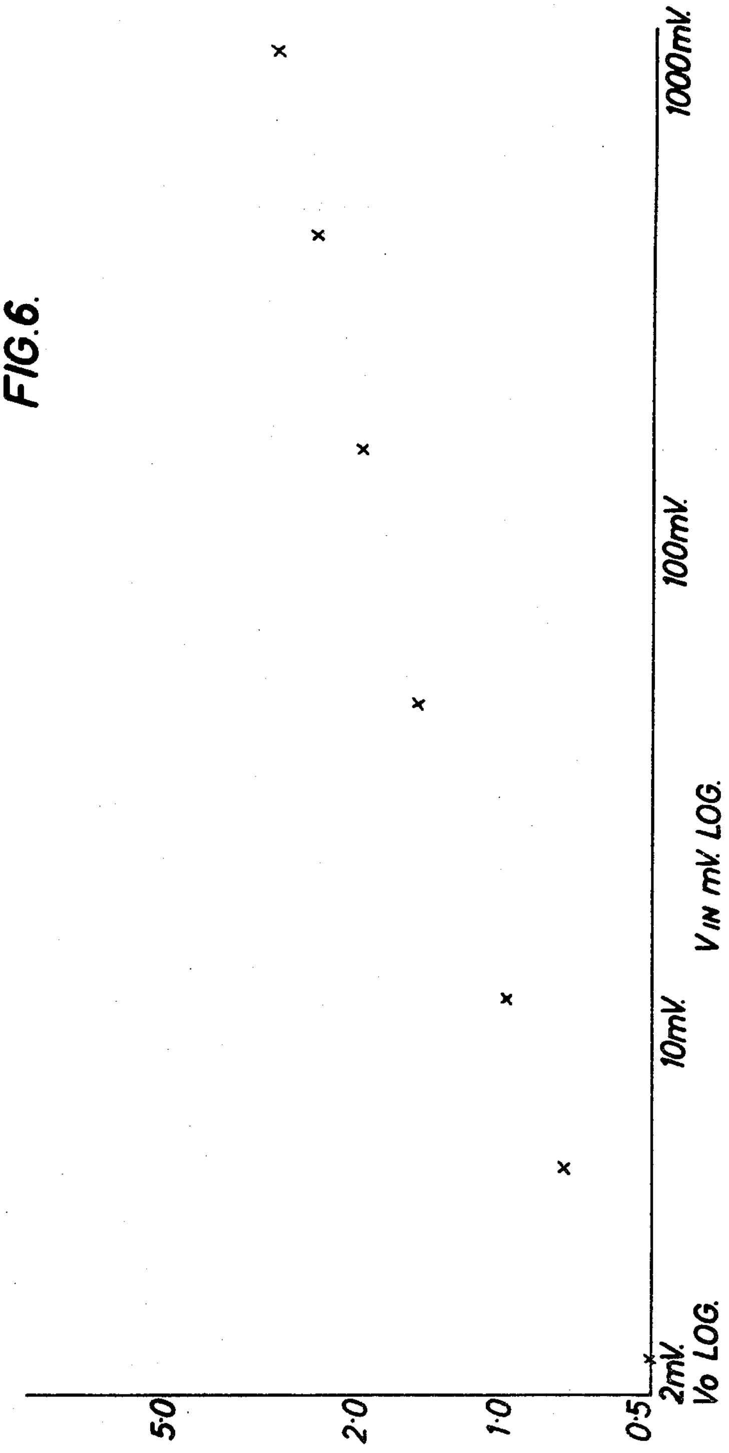
FIG. 6 is a graph of amplifier output on a logarithmic scale plotted against a base of amplifier input also a logarithmic scale.
Figure 7:
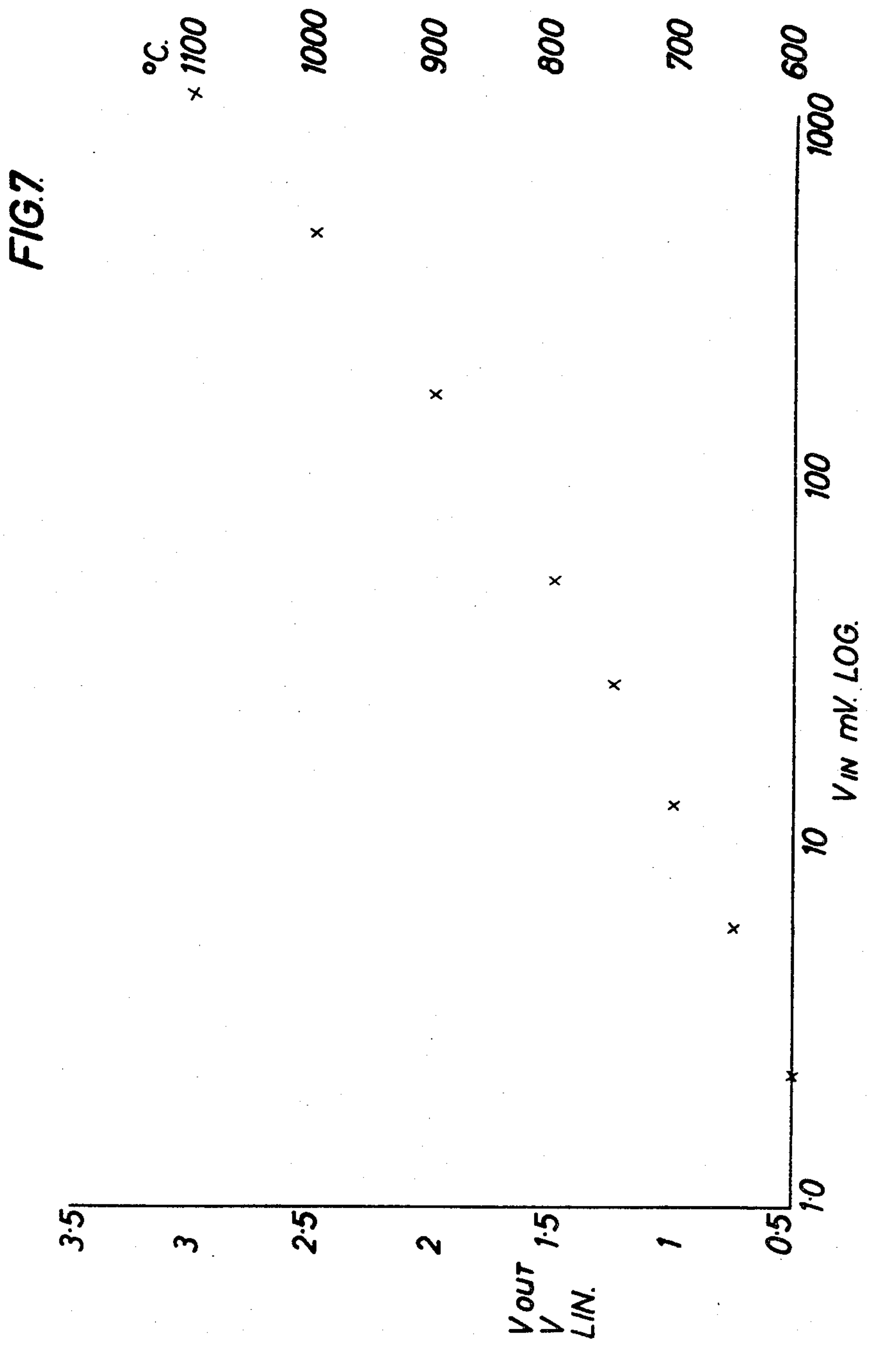
FIG. 7 is a graph of amplifier output on a linear scale plotted against a base of amplifier input on a logarithmic scale.

The invention has particular application to gas turbine engines where the pyrometer amplifier receives input signals from the pyrometer head and provides a temperature compensating output feedback to the head, and provides output signals varying linearly with temperature which are fed to the engine control system and also to a flight deck indicator (FIG. 4).

Figure 1:
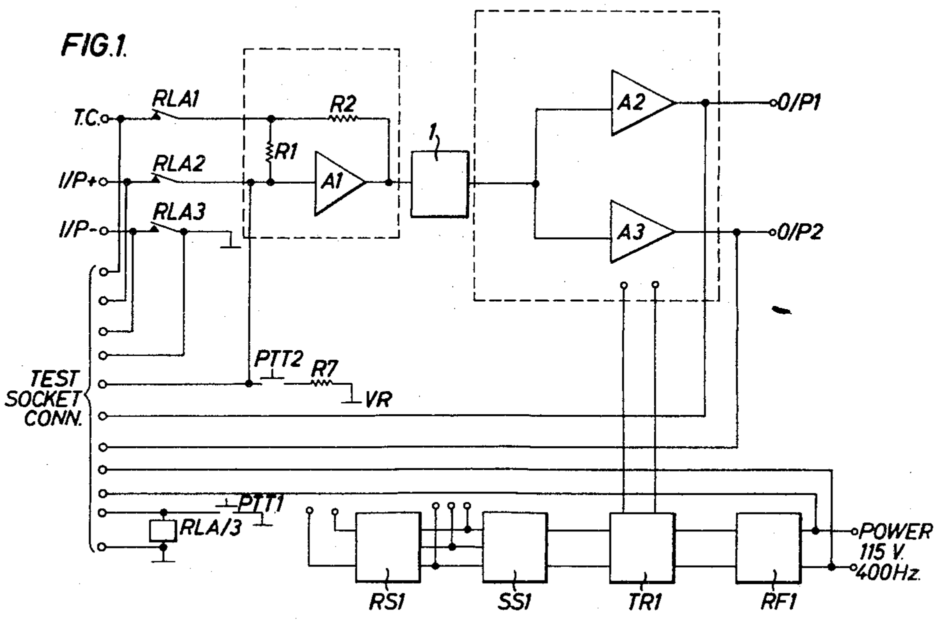
FIG. 1 is a block diagram of a pyrometer amplifier.

Referring to FIG. 1, the incoming signals I/P+ from the head are buffered and conditioned in an input amplifier A1 (see also FIG. 2), linearized in a linearizing circuit 1 (see also FIG. 3) and fed out through the output amplifiers A2,A3, to the components specified above such as the flight deck indicator (FIG. 4). The DC input signals I/P+ and I/P− are connected to the input of amplifier A1 and a test socket connection terminal via normally open contacts RLA2, RLA3, respectively, and a further contact RLA1 is connected in series with resistors R1,R2 in the line to which the temperature compensated input signals TC is applied. The three contacts are actuated in response to energization of the winding of relay RLA/3 and two test functions are built into the system. Firstly, a press-to-test switch PTT1 operates to energize the winding of relay RLA/3 to disconnect the pyrometer head from the system while depression of the bush-button switch PTT2 inserts a small current from a reference voltage source VR via resistor R7 to provide a reference voltage input to the system.

The output to the engine control system is provided with a hold-up circuit which presents appreciable change in output value during emergency switching of the essential supplies busbar and the resulting momentary loss of the supply to the unit.

Figure 3:
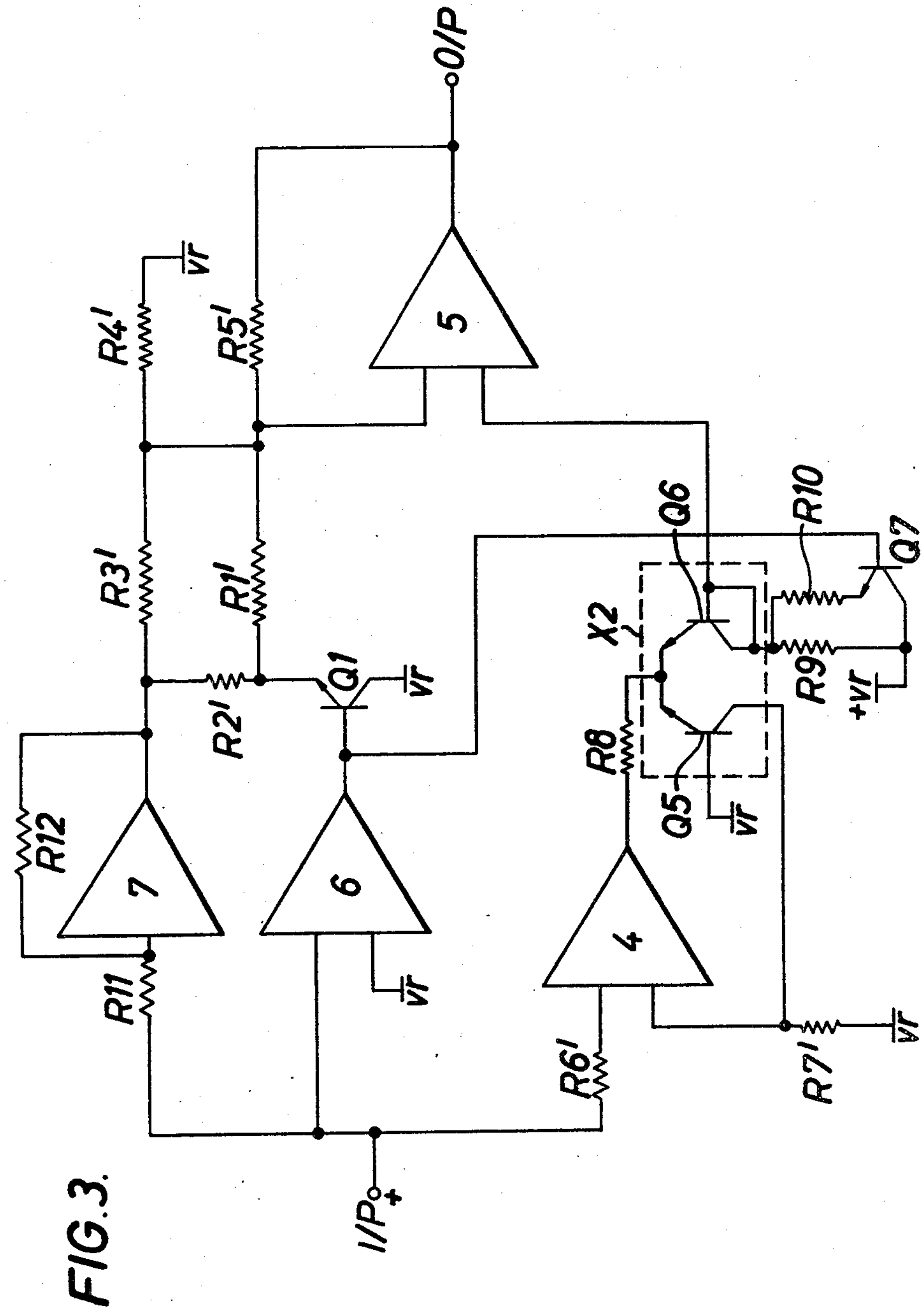
FIG. 3 is a diagram of the linearizing circuitry of the pyrometer amplifier.

The power supplies (FIG. 5) provide isolated stabilized voltages to all the above circuitry. To divorce the accuracy of the unit from the stability limitations of the main supply rails, all amplifiers are referred to two specially derived reference rails. The self-test facility referred to above disconnects the pyrometer head and inserts a test signal into the amplifier via the resistor R7 (FIG. 3). An external test facility disconnects the pyrometer head from the amplifier and brings corrections from both to the test socket.

Figure 2:
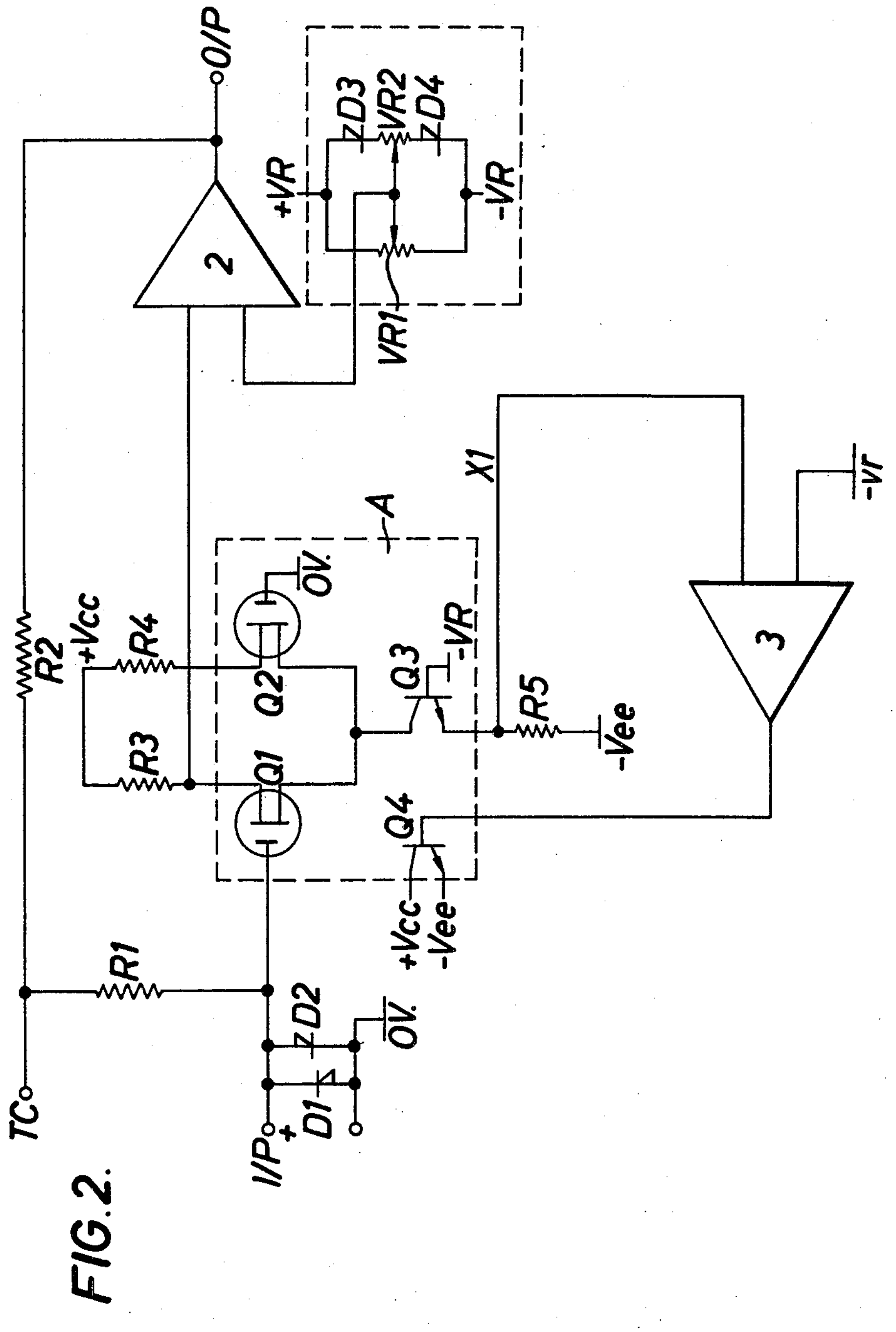
FIG. 2 is a basic circuit diagram of the input amplifier thereof.

Referring to FIG. 2, a pair of input field effect transistors Q1,Q2 operating as a long tailed pair are within a silicon chip A which is heated by a transistor Q4 to give a constant chip temperature. This temperature is sensed by the remaining transistor Q3 on the chip A. The transistor Q3 provides a constant current to transistors Q1,Q2 by maintaining a constant voltage across resistor R5 which is connected between the emitter of transistor Q3 and a negative voltage source-Vee. Transistor Q3 also serves as the sense element for the chip temperature as previously stated and performs this operation as follows: The gate of Q3 is held constant at the reference supply voltage −VR and the source voltage at resistor R5 is compared with a reference voltage $-vr$ by means of amplifier 3 ($-vr$ is a reference voltage derived from the reference supply VR). Amplifier 3 in turn controls the gate voltage and current in transistor Q4 such that the whole chip is maintained at a temperature higher than the maximum ambient temperature for the unit. Considering the three transistors Q1,Q2,Q3, if the source to gate voltage of transistor Q3 is held constant to within the guaranteed offset swing of amplifier 3, then the gate to source voltages of transistors Q1,Q2 will, being on the same chip, maintain the same controlled range. Transistor Q1 is connected to amplify the DC input signal I/P+ and the long tailed pair amplifier formed by transistors Q1,Q2 is designed to give a gain of 10. Amplifier 2 accepts the amplified signal from Q1 and further amplifies it and passes the amplified signal to the output O/P. Amplifier 2 exhibits input offset changes which are reflected back into the transistor input pair Q1,Q2. To bring these changes within predetermined limits, temperature compensation is effected by adjustment of the wiper of potentiometer VR2 connected to the input of amplifier 2. Diodes D3,D4 connected in series with potentiometer VR2 exhibit a reduction in forward voltage drop with temperature and thus, the positive end of potentiometer VR2 will rise towards +VR and the negative end of potentiometer VR2 will fall towards −VR, as the temperature increases. The correct setting for potentiometer VR2 will introduce a change of voltage into the input of amplifier 2 which compensates for the temperature drift of transistor circuit X1 and amplifier 2. The wiper of potentiometer VR1 is connected to the input of amplifier 2 and is set to produce zero nominal offset in amplifier 2 and circuit X1 including transistor pair Q1,Q2.

Resistors R1,R2 are required to normalize the pyrometer signal on input line I/P+ to the output condition. Diodes D1,D2 connected between the I/P+ and the 0 volts line. protect transistor circuit X1 against input spikes since field effect transistors such as Q1,Q2 may be destroyed by even low power transients in excess of the insulation capability by "-punch through" effects. Although these diodes D1,D2 are in effect shunting the input to earth, this will not degrade the input characteristic, as would a similar shunt across the gate source connections of transistor Q1 since they suffer only a very low voltage drop. The collectors of transistors Q1,Q2 are coupled via respective resistors R3,R4 and connected to positive voltage source +Vcc and the base of transistor Q2 is connected to the 0 volts line.

The input characteristics of the pyrometer amplifier are in fact such as to exclude the input amplifier of FIG. 2. For test purposes, therefore, the amplifier must be calibrated on the assumption that the temperature compensated signal terminal TC (FIG. 2) at the junction of resistors R1,R2 is open circuited and input currents of a predetermined value are injected.

Although the chip A of transistor circuit X1 demands an inrush current and warm-up time, the size of a silicon chip is so small that the warm-up can be continued within 1 second at an extra power consumption of 1 watt. Further to this, the whole element is so small that the local heat dissipation is negligible.

Figure 8:
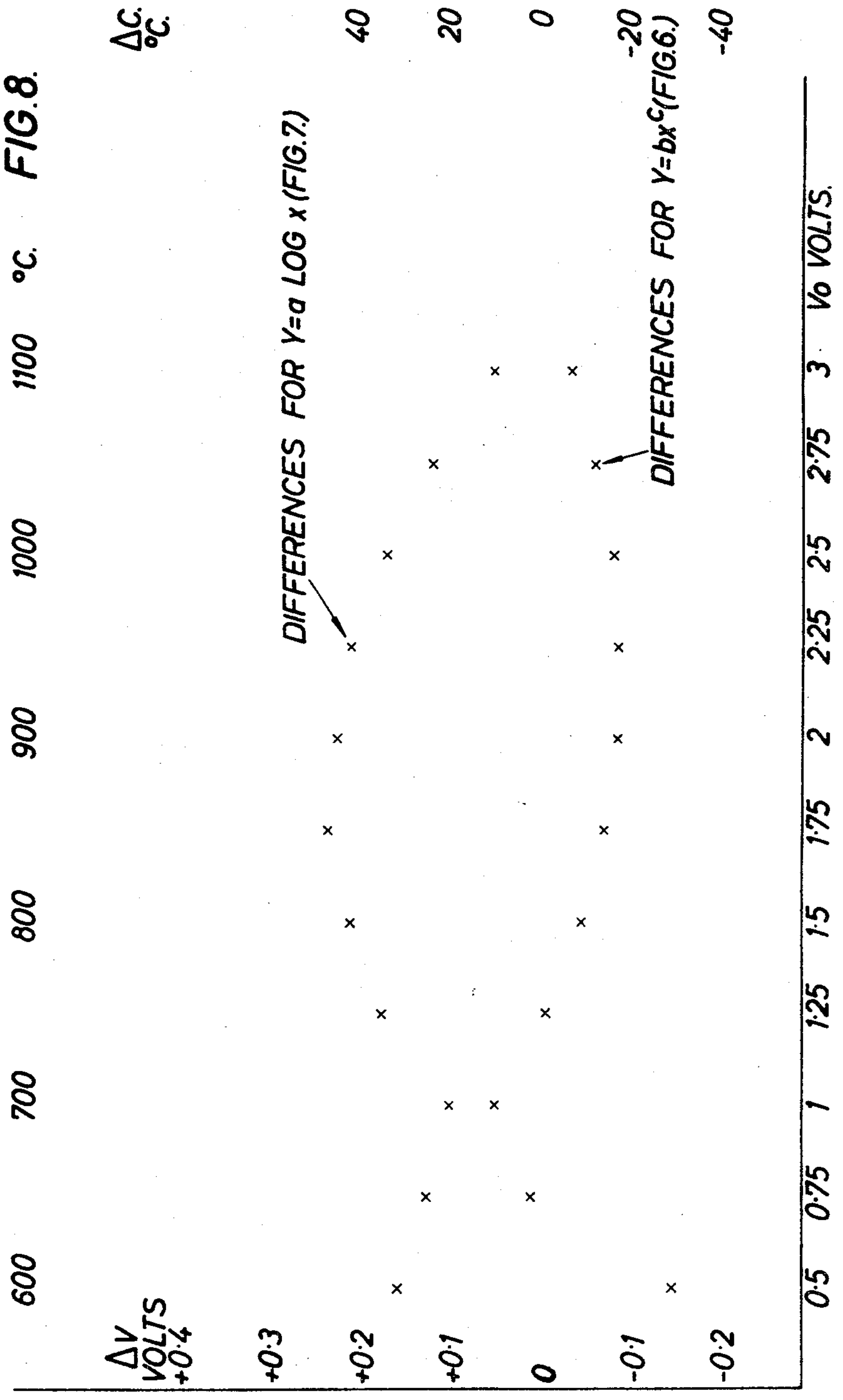
FIG. 8 is a graph of difference voltages from the graphs of FIGS. 6 and 7 plotted to a base of output voltage.

For simple logarithmic linearization, as stated previously, the graph of output on a linear scale against input on a logarithmic scale gives an approximation to a straight line which is almost as close as that obtained from a graph of output on a logarithmic scale plotted against input also on a logarithmic scale. If a graph is plotted of the difference between the required function and the function $$y = \log x \quad (1)$$

where $x$ is the input voltage, the convex curve of FIG. 8 is obtained.

The linearizing circuitry of FIG. 3 mechanizes the computation called for above and the section of the computation defined by equation (1) is performed by resistors R6′,R7′,R8′,R9′ and R10′, amplifier 4, transistor circuit X2 comprising transistors Q5,Q6 and transistor Q7. It is well known that for a transistor, $$I_c = I_s \exp. (qV_{be}/KT) \quad (2)$$

where $I_c, I_s$ are the collector and saturation currents, $q$ is the charge on an electron, $K$ is Boltzmann's constant, $T$ is absolute temperature. or, for $V_{be}$ $$V_{be} = KT/q \log (I_c/I_s) \quad (3)$$

For the matched pair of transistors, Q5,Q6, $$d\, V_{be} = V_{be1} - V_{be2} = KT/q \log (I_{c1}/I_{s1}) - \log(I_{c2}I_{s2}) = KT/q \log (I_{c1}/I_{c2}) + \log (I_{s1}/I_{s2}) \quad (4)$$

For integrated pairs, as these are, the saturation current term is constant and of the order of ½ mV. So, to a close approximation.

$$d\, V_{be} = KT/q \log (I_{c1}/I_{c2}) \quad (5)$$

Now, considering the transistor circuit X2, and considering amplifier 4, the negative feedback at the summing junction of the collector of transistor Q5 and resistor R7′ ensures that $$I_{c1} = V_{in}/R_7' = x/R_7' \quad (6)$$

The collector current of the second transistor is determined by $+vr$ and resistor $R_9$ at $$I_{c2} = vr/R_9 \quad (7)$$

Hence from Equation 5, $$d\, V_{be} = KT/q \log (x\, R_9/vr\, R7') = KT/q \log A x. \quad (8)$$

A change in the ambient temperature T of the transistors Q5,Q6 introduces a change in the slope of this output characteristic. To minimize this, a temperature stabilized substrate transistor pair is employed for transistor circuit chip X2.

Figure 10:
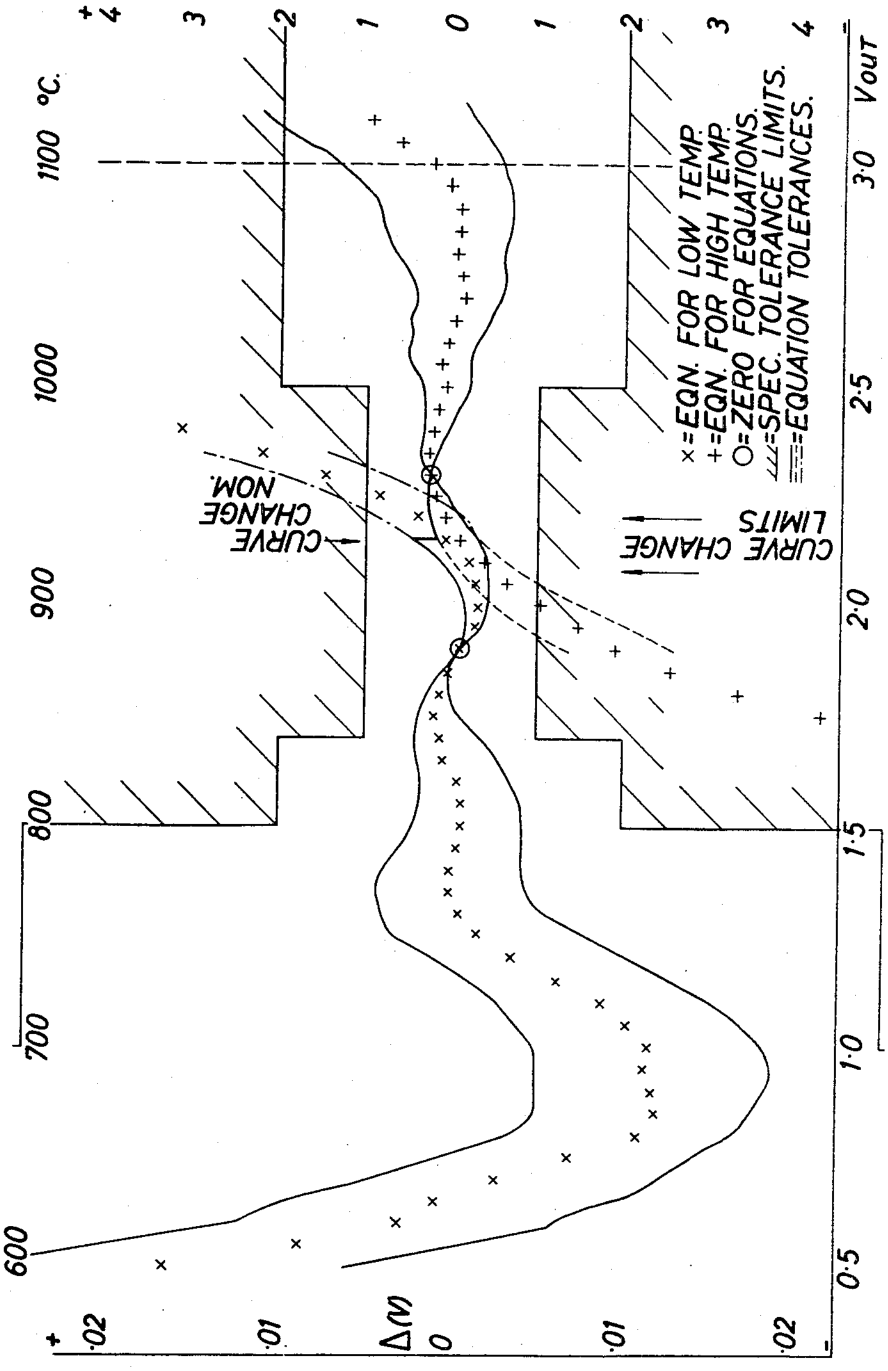

This device, which is a monolithic integrated circuit, has a separate sense element and amplifier and power element within the circuit, which maintain the chip A at a constant temperature giving the same effect as for the input transistors previously referred to. By this means, the slope change is restricted to ½ percent maximum. Further to this, however, the change of the log is pivoted about the point at which the function $Ax = 1$, since $\log 1 = 0$. Hence, $$\text{if } V_p \times R9 = Vr \times R7',$$

the curve will pivot as shown in FIG. 10, and the tolerances will increase at a ½ percent rate from this point as shown. For the second section of the curve, transistor Q5 (and transistor Q6) turns on, placing resistor R10 across resistor R9. This reduces the effective value of resistor R9 and the change is so set that the new pivot point is that shown to the right in FIG. 10. There are further tolerances to account for in this circuit. The input signal must be sufficiently large, e.g. 0 – 8V that the offset change with temperature of amplifier 4 may be regarded as negligible. The static offset of amplifier 4 must be zeroed at the end of resistor R7′ and the small offset required as stated below, inserted. The resistor tolerances of 0.04 percent are negligible beside the tolerance of 0.5 percent for the logarithm generator itself. Resistor R6′ connected between the input terminal I/P+ and the input to amplifier 4 balances the input conditions of amplifier 4, and resistor R8, connected between the output of amplifier 4 and the coupled emitters of transistors Q5,Q6 provides a working swing for amplifier 4.

Figure 9:
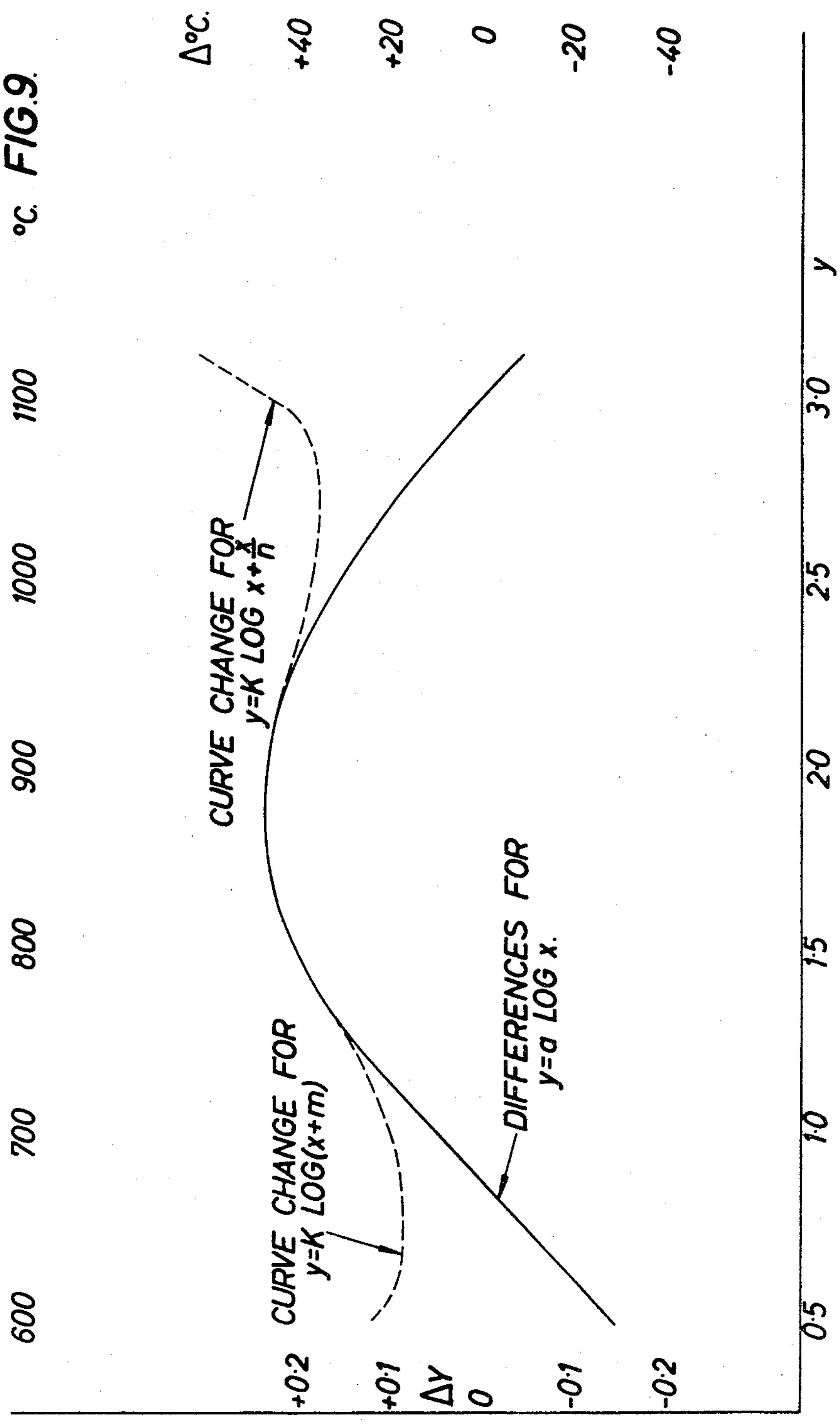
FIG. 9 is a graph illustrating the change in difference voltages due to correction techniques and FIG. 10 is a graph of corrected linearized function differences.

If a small constant is added to the incoming signal giving a transfer function of the form $$y = \log (x + m) \quad (9)$$

this will tend to increase the value of $y$ for values of $x$ where $x$ is not much greater than $m$. Taking the actual values of the pyrometer signal, if $m$ is $2m$V, this will double the input signal at 600° C but will give a variation of only 0.2 percent to it at 1,100°C. This gives a shift of 0.3 (6° C) at 600° C but of only 0.00008 (0.02° C) at 1,100° C. The actual effect of this modification upon a curve is of the general form shown in FIG. 9 at the left hand end thereof. The correction is applied by a small adjustment to the offset voltage of the logarithmic amplifier, that is, an adjustment of value of $vr$. Instability in the precise value of this offset is not too important since the effect of this is almost entirely restricted to the non-critical temperatures below 750° C.

Thus, amplifier 4, circuit chip X2 and the associated resistors and the offset voltage $vr$ comprise means responsive to an input signal (the input signal which varies non-linearly with temperature has, in the disclosed embodiment, a value A$x$ as derived at the output of amplifier A1 of FIG. 1) to generate an intermediate signal representative of the logarithm of a linear function of such input signal (the intermediate signal in the disclosed embodiment being of the form $\log (x + m)$ and being derived at the base of transistor Q6 in FIG. 3).

If a small proportion of the input signal is added to the output, giving a transfer function of the form $$y = \log x + x/n \quad (10)$$

where $n$ is of the order of the largest input voltages, the result will be to increase the output at high values of output while having little effect at low values of output. To take similar examples to those above, for $n = 6{,}000$ at 600° C the difference will be only 0.0008 (0.08° C) whereas at 1,100° C the output will increase by 0.19 (38° C). The general form of this correction is as shown at the right of the curve in FIG. 9. The mechanization of this correction is by the connection of a simple resistor across the logarithmic circuit into the output amplifier as a summing coefficient. Although the correction is important at the critical temperatures, being of the order of 6percent, the simplicity of this correction is such that it can be made extremely accurately by a suitable choice of resistor.

The limitation of the above method is unfortunately reached in the correction of the required characteristic. As will be seen in FIG. 9, the correction of a characteristic with the degree of curvature present in the logarithmic function defined by the input-output characteristics of the amplifier can only be achieved, by the summation of both these techniques to within 5° C, which is appreciably worse than the specification limits.

However, the curves can be linearized to within a fraction of a degree over any given half decade of input signal. If the constant $n$ and the gain of the output summing amplifier are changed, a simple amalgamation of the techniques including the output summing technique previously described gives the required accuracy over the two-third decade of input signal from 850° to 1,000° C., together with a further accurate section outside this region to allow for any future improvements demanded for the amplifier. The linearizing circuit of FIG. 3 permits these changes to be applied, and linearization of the lower end of the characteristic is performed to a sufficiently close approximation by the input offset technique previously described. The linearizing circuit of FIG. 3 is further explained hereinafter. For the present purposes let it be assumed that it gives two transfer functions viz:

$$y = 0.87 \log (x + 2) + x/2{,}000 - 0.034 \qquad (11)$$

for $x$ less than 236; ($x$ in mV)

$$y = 1.053 \log (x + 2) + x/6{,}500 - 0.39 \qquad (12)$$

for $x$ greater than 236;($x$ in mV).

Then the resulting error curve is as shown in FIG. 10. The points marked with $x$ are taken from the low temperature Equation (11) and those marked + are derived from the high temperature Equation (12). The solid lines show the temperature drift to be expected in this linearization network, and the implications of these limits will be further explained hereafter. The specification limits are shown by the hatched area, and it will be seen that this linearization technique can give a real accuracy over the required ambient temperature range.

However, the approach outlines here can be made to meet similar accuracies for any input/output characteristic of this general type and curvature over a range of up to 1 decade (200° C) at any specified point.

The remaining circuitry of FIG. 3 provides the modifying actions called for above.

Since the base of the first transistor Q5 in circuit chip X2 is held at O$v$, the input to amplifier 5 will vary as the base voltage of the second transistor Q6, that is, as log A$x$. Amplifier 5 will then provide outputs as follows (ignoring the 2 mV addition in $x$)

For transistor Q1 off, $$Vo = R5' \log Ax/R4' \,\&\, R3' (R2' + R1') - (-x)R5'/(R3' \,\&\, R2' + R1')) - R5'x\, vr/R4'$$

For transistor Q1 on, $$Vo = R5' \log Ax/(R4' \,\&\, R3' \,\&\, R1') - (-x)R5'/R3' - vr\, R5'/RA$$

$R2'$ is merely shorted to $vr$ by transistor Q1, (the & indicates paralleled resistors). By inspection it can be seen that the changes in the coefficients and offsets of the circuits are in the correct sense to produce the required shift in the equations, that is, as the gain of the log rises, that of the direct $x$ falls, as transistor Q1 turns on. The offset changes in accordance with the value of $vr$.

Amplifier 6 has an offset introduced into it in such a sense that the amplifier swings over, with open loop gain, at a defined value of $x$. This is set at 236 mV nominal; the offset drift of amplifier 6 is 1.2 mV maximum, and thus the curves will change over well within the limits shown on FIG. 10.

Amplifier 7 and resistors R11 and R12 constitute means responsive to the input signal to invert the direct fraction of the input signal into amplifier 5 as required by the above equations.

Errors due to resistor tolerances are low even here; the resistor tolerances for resistors R4',R5', which are the main log gain defining components, are controlled to within 0.05 percent. However, the offset error of amplifier 5 which is of the order of 0.6 mV, will be added to the errors shown on FIG. 10 (an extra 0.2° C). The right hand curve will see a further error due to the extra offset, the error being a maximum of 0.05 percent of 0.39 volts (the tracking error of the resistors), a value of 0.2 mV, giving a further 0.1° C max. Tolerances against the other coefficients are negligible, in that the contribution of these coefficients is less than 5percent of the signal and thus even a 0.1 percent error would only contribute a final error of 0.005 percent to the final figure.

Thus, amplifier 6 and transistor Q1 constitute means functioning as a control means responsive when the input signal reaches a predetermined value to produce a change in the value of the fraction controlling function of amplifier 7 and to produce a change in the value of the gain provided by the summing amplifier 5. This operation extends the temperature range through which the output signal of amplifier 5 varies linearly with temperature.

The output amplifiers are shown in FIG. 4. The signal from the linearizing circuit (FIG. 3) is applied to potentiometer VR3 and amplifier 8 is supplied from the unit common power supplies through limiting resistors, to protect the common power supplies against failure of the amplifier. Resistors R12 and R14 define the gain of the amplifier and capacitor C1 connected between the input and output of the amplifier controls the response of the unit on the output on conductor O/P1 to theflight deck indicator. Capacitor C1 may be charged to permit varying response times.

Amplifier 9 supplies the output on conductor O/P2 to the engine control system. In order to prevent false information being fed through output O/P2, subsequent to the 500 mS interruption to the supplies which may occur during the switching of the essential supplies busbar from the generators to the emergency inverters, output O/P2 has provision for maintaining its value during such an interruption. Although the control system itself is immobilized during this switching operation, the response of the amplifier, if the output were allowed to fall, would be such that the control system would see false information after the supply was reinstated pending the build up of the output signal. The operation of this circuit is as follows.

Upon supply interruption, transistor Q8 which is energized by the normal supplies of the unit, switches off and amplifier 9 instead of amplifying the pyrometer signal, maintains its own output voltage constant for as long as it is supplied with power. If the output tried to change, the change would be fed back through capacitor C2 and the resulting input would tend to oppose the change. The only resulting change produced will be that due to the leakage current in capacitor C2 and the bias current into amplifier 9. These total 6 uA maximum, and for a value of 270 uF minimum for capacitor C2, the discharge will be $$V = it/c = 6 \times 10^{-6} \times \tfrac{1}{2}/270 \times 10^{-6} = 11 \text{ mV} = 2.2° \text{C}$$

As has been stated, in order for this action to be effective, amplifier 9 must be energized. This is ensured by driving amplifier 9 from a separate supply, comprising a conventional series stabilizer consisting of transistors Q9,Q10, and in which Zenerdiode, ZD1 acts as a reference element, transistor Q10 as the comparator and transistor Q9 as the series element. Capacitor C3 from which this supply draws its energy during supply interruption, is normally charged to 90 volts. The amplifier 9 takes 2.8 mA max, the load takes 0.6 mA, the stabilizer needs 2 mA max, and capacitor C3 is 40 uF min. The rundown from 90 volts will progress for a total current demand of 5.4 mA to a level of $$V = 90 - it/C = 90 - 5.4 \times 10^{-3} \times \tfrac{1}{2}/40 \times 10^{-6} = 22 \text{ volts}$$

Since the supply to amplifier 9 is 16 volts, this leaves amplifier 9 still operating. Resistors R19 and R20 reference the supply to amplifier 9 to the rest of the supply rails. When transistor Q8 is on, amplifier 9 with resistors R15 and R16 and capacitor C2 give the same response time control as that available for amplifier 8. However, since capacitor C2 is fixed in value, resistors R15 and R16 must be changed to alter the response time. It should be noted that the two output amplifiers 8 and 9 can be set to have different response times if required.

Each of these output amplifiers contributes a maximum offset drift with temperature of 0.2° C at the output.

Figure 5:
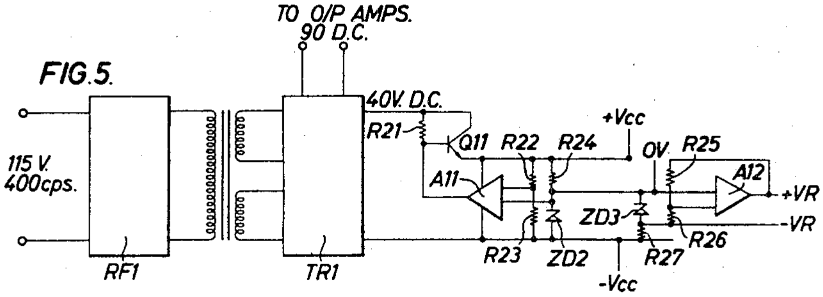
FIG. 5 shows the power supplies for the various components.

The power supplies are shown in FIG. 5 and the incoming supplies are suppressed against both incoming and outgoing radio frequency interference in a conventional double L inductive capacitive filter RF1 (See also FIG. 1). They are then transformed, rectified and smoothed in TR1 to give two independent DC rails of 90 V and 40 V nominal. The former rail is fed to the output amplifiers as previously explained, while the latter passes to the main stabilizer Q11, A11 shown as SS1 in FIG. 1. The base of transistor Q11 and the output of amplifier A11 are connected to the 40 V DC line via resistor R21. Since very few of the circuits use power from the OV rail, it is not necessary to provide two full supplies; amplifier A11 compares the voltage of Zenerdiode ZD2 with half the stabilized voltage as derived at the tap of resistors R22, R23. It then controls transistor Q11 to hold the total supply voltage at + and − 15 volts. The OV rail is taken at Zener diode ZD2 and is, by definition, halfway between the two rails. This gives improved stability over the conventional two supply arrangement, in that many of the circuits in the unit are not sensitive to identical changes in both supplies.

The reference rails are derived by Zenerdiode ZD3 and amplifier A12. Zenerdiode ZD3 is energized via resistor R27 and the tap between them provides a low current negative reference rail =VR. Zenerdiode ZD3 is chosen for its temperature stability; it has a maximum drift of 3 mV in 6 volts over the unit temperature range. This is equivalent to a drift at the output of 0.3° C maximum. Amplifier A12 compares the potential of the mid-point of resistors R25 and R26 with OV and since resistors R25,26 are connected across the two reference rails +VR, −VR, amplifier A12 gives a positive reference rail with the same characteristics as the negative one, but at higher power. The unit circuitry is so arranged that the higher power demands are made on the positive reference rail.

As previously discussed, there are two test functions built into the unit. Firstly, a press to test switch PTT1 as shown in FIG. 1 operates to energize the winding of relay RLA/3 to disconnect the pyrometer head from the unit, while the other switch PTT2 inserts a small current from the reference rail +VR via resistor R7 (FIG. 1) to provide a known input to the unit. Thus, the output should also indicate a known value.

Secondly, on insertion of a test box connector into the test socket connection, the winding of relay RLA/3 is again energized and at the pyrometer head the unit terminations are then separately available for appropriate test routines to be performed by the test box.

Reverting to the arrangement of FIG. 1, a detection circuit fitted to the outputs of amplifiers A2, A3, to enable a positive indication to be fed to the engine control system in the event of the unit failing, may be incorporated in the system if required.

A further facility readily provided by the unit, this time for 'engine condition' monitoring, is that of the time temperature recording. Since the output from the input amplifier A1 (FIG. 1) is nearly expotential with temperature, the addition of a voltage to frequency converter, low temperature gate circuit, and pulse counter at this point provides an additional maintenance facility for the engine in that a record of this form is readily related to turbine blade creep.

The invention is susceptible to considerable modification and is not to be deemed limited to the specific circuit and constructional details referred to herein by way of example only.

The input amplifier may be housed in a temperature stabilized environment. However, surrounding components may suffer from the heating and a DC chopper amplifier or a conventional chopper-stabilized amplifier may be fitted.

A chopper amplifier effectively is an AC amplifier which amplifies a square wave obtained by chopping from the input signal to OV. The resulting amplified square wave is detected and DC restored at the output of the amplifier. The former device, however, must operate at less than 1 KHz chopper frequency, to keep the input current low, and the roll off from the gain of 60,000 at 6dB per octave for Nyquist stability will give a gain-bandwidth product of 100c/s. At the gain levels of the input circuit, this will not permit the required minimum response time. A chopper-stabilized amplifier stabilizes the DC conditions of an AC operational amplifier, and by a careful choice of crossover network, the total combination has a tight gain bandwidth product.

Chopper-stabilized amplifiers achieve an ultralow offset voltage and bias current by 'chopping' the low frequency component of the input signal, amplifying this chopped signal in an AC amplifier and then demodulating the output of the AC amplifier. The output is further amplified in a second stage of DC amplification and high frequency signals, which are filtered out at the input of the chopper channel, are capacitively coupled into the second stage amplifier. DC offsets and drift of the second amplifier are reduced by a factor equivalent to the gain of the chopper channel and the AC amplifier introduces no offsets. The input choppers must be insulated gate field effect transistors, since a junction field effect transistor takes too much gate current at 70° C, a mechanical chopper is unreliable, and a bipolar transistor chopper has a large and variable offset. The chopping frequency must be controlled away from any even multiple of 400c/s (as modified) to prevent inphase pickup in the cabling. The advantage of the chopper-stabilized amplifier is its insensitivity to component changes due to ageing, temperature change, power supply variation or other environmental factors.

I claim:

1. In a linearizing circuit responsive to an input signal that varies non-linearly with temperature to produce an output signal that varies linearly with temperature over a temperature range, the combination comprising first means responsive to said input signal for generating a first intermediate signal representative of the logarithm of a linear function of said input signal, second means responsive to said input signal to provide a second intermediate signal representative of a predetermined fraction of said input signal, and third means for summing the first and second intermediate signals to thereby produce said output signal.

2. In a circuit in accordance with claim 1 wherein said third means includes an amplifier having a gain, said second means includes control means connected to said third means and responsive when said input signal reaches a predetermined value to produce a change in the value of said fraction and also to produce a change in the value of said gain to thereby extend said temperature range over which said output signal varies linearly with temperature.

3. In a circuit in accordance with claim 1 wherein said first means includes means for producing a signal equal to the sum of said input signal with a signal of predetermined fixed value to produce said linear function of said input signal.

4. In a circuit in accordance with claim 3 wherein said third means includes an amplifier having a gain, said second means includes control means connected to said third means and responsive when said input signal reaches a predetermined value to produce a change in the value of said fraction and also to produce a change in the value of said gain to thereby extend said temperature range over which said output signal varies linearly with temperature.

5. In a linearizing circuit as claimed in claim 1 and further comprising an input amplifier stage having a pair of field effect transistors operating as a long tailed pair and responsive to source signals varying non-linearly with temperature to produce amplified output signals having a predetermined gain, said transistors being located within a chip of semiconductive material arranged to be heated by a third transistor to give a constant chip temperature, said third transistor having the base thereof connected to the output of a DC amplifier having an input connected to a voltage reference source, the temperature of the chip being sensed by a fourth transistor having the collector connected to the coupled emitters of the said pair of transistors to provide a constant current to the said transistors, and the amplified signal from one of said pair of transistors being further amplified in a further DC amplifier connected to the collector of said one transistor.

6. In a linearizing circuit as claimed in claim 5 wherein said further DC amplifier has the output thereof connected to the base of said one of said pair of transistors and exhibits input offset changes.

7. In a linearizing circuit as claimed in claim 6 wherein an input of said further DC amplifier is connected to a temperature compensating circuit to confine the offset changes within predetermined limits.

* * * * *